US006104310A

United States Patent [19]

Miyashita

[11] Patent Number: 6,104,310

[45] Date of Patent: Aug. 15, 2000

[54] PAGER WITHOUT DELETING MESSAGES

[75] Inventor: Mafumi Miyashita, Shizuoka, Japan

[73] Assignee: NEC Corporation, Tokyo, Japan

[21] Appl. No.: 08/881,801

[22] Filed: Jun. 24, 1997

[30] Foreign Application Priority Data

Jun. 25, 1996 [JP] Japan .................................... 8-164263

[51] Int. Cl.[7] ........................................ H04Q 7/14

[52] U.S. Cl. ................................ 340/825.44; 455/186.1; 455/566; 455/550; 340/825.47

[58] Field of Search ................................ 455/186.1, 566, 455/550; 340/825.44, 825.47

[56] References Cited

U.S. PATENT DOCUMENTS

| | | | |
|---|---|---|---|
| 5,049,874 | 9/1991 | Ishida | 340/825.44 |
| 5,225,826 | 7/1993 | DeLuca | 340/825.44 |

FOREIGN PATENT DOCUMENTS

| | | |
|---|---|---|
| 0261417 | 3/1988 | European Pat. Off. . |
| 63-54616 | 3/1988 | Japan . |
| 63-82134 | 4/1988 | Japan . |
| 1-114996 | 5/1989 | Japan . |
| 4-175018 | 6/1992 | Japan . |
| 6-152501 | 5/1994 | Japan . |
| 8-130758 | 5/1996 | Japan . |

*Primary Examiner*—Michael Horabik
*Assistant Examiner*—Matsuichiro Shimizu
*Attorney, Agent, or Firm*—Sughrue, Mion, Zinn, Macpeak & Seas, PLLC

[57] ABSTRACT

A pager which does not delete or rewrite received messages can be produced at such a low cost that it is viable as a disposable pager. Messages are stored sequentially as they are received, packed in memory end-to-end, so that memory efficiency is maximized. No complex memory management is required, minimizing production costs. If memory is full or near-full when a new message is received, either the message is displayed and not stored, or receipt of the new message is refused. By using removable, nonvolatile memory modules, the pager unit can be reused, while enabling old messages to be externally archived for indefinite periods of time.

4 Claims, 4 Drawing Sheets

FIG. 3A

| MESSAGE | TIMESTAMP | |
|---|---|---|
| 0123456789 | 10/10 | 10:59 |
| 11111 | 11/03 | 12:10 |
| 22222 | 11/12 | 20:28 |

FIG. 3B

| | | | | | | | | | | | | | | |
|---|---|---|---|---|---|---|---|---|---|---|---|---|---|---|
| 0 | 1 | 2 | 2 | 4 | 5 | 6 | 7 | 8 | 9 | ▲ | 1 | 0 | : | 5 |
| 9 | – | 1 | 0 | / | 1 | 0 | ■ | 1 | 1 | 1 | 1 | 1 | ▲ | 1 |
| 2 | : | 1 | 0 | – | 1 | 1 | / | 0 | 3 | ■ | 2 | 2 | 2 | 2 |
| 2 | ▲ | 2 | 0 | : | 2 | 8 | – | 1 | 1 | / | 1 | 2 | ■ | |
| | | | | | | | | | | | | | | |

△ TERMINATOR CODE #1(BETWEEN MESSAGE AND TIMESTAMP)

□ TERMINATOR CODE #2(AFTER TIMESTAMP)

PAGER WITHOUT DELETING MESSAGES

BACKGROUND OF THE INVENTION

The present invention relates to a pager, and in particular, to a pager which is capable of receiving message information and has functions for displaying the received messages.

Description of the Prior Art

Various kinds of pagers for receiving radio selective calling are put on the market. Among them, there exists pagers provided with functions for receiving message information and displaying the received messages.

When such a conventional pager with functions for receiving and displaying messages stores a newly received message in its storage means whose storage area is full of received messages, the pager generally deletes the oldest message information stored in the storage means, or in the case where the pager is assigned with plural selective calling numbers, it may delete a stored message sent to a selective calling number of low priority according to the priority order predetermined for every selective calling number of the pager, as disclosed for example in Japanese Non-examined Patent Publication No. 63-82134.

As mentioned above, on receiving new message information, the afore-mentioned conventional pagers with functions for receiving and displaying messages deletes stored message information first, for example, the message information sent to a low priority selective calling number of the pager according to the predetermined priority order of selective calling numbers, and then stores newly received message information in the storage means. Therefore, the conventional pagers need to have control programs for controlling complicated processes for managing the storage means, and the production cost of the pagers becomes higher.

SUMMARY OF THE INVENTION

It is therefore the primary object of the present invention to provide a pager which does not need complex control programs for controlling complicated processes for managing the storage means, and to thereby reduce the production cost.

Another object of the present invention is to provide a pager which can be produced at a low cost and can be supplied as a disposable pager.

In accordance with the present invention, there is provided a pager comprising display means to display received messages, informing means to inform users of reception of information, storage means to store the received messages in order of reception in which additional information such as receiving time of the message and one or more terminator codes are added to each received message, means for reading out messages stored in the storage means by searching for the terminator codes and displaying the messages by the display means, and means for prohibiting storing the received messages into the storage means after the storage means becomes almost full of messages. The prohibiting means can be designed to prohibit receiving messages thereafter too.

In accordance with one aspect of the present invention, the first terminator codes written between received messages and their additional information, and the second terminator code written right after additional information, are used as the terminator codes.

In accordance with another aspect of the present invention, the storage means is made capable of being easily removed and attached to the body of the pager. Preferably, the storage means has nonvolatile character capable of holding the stored received messages even after it is removed from the body of the pager.

BRIEF DESCRIPTION OF THE DRAWINGS

The objects and features of the present invention will become more apparent from the consideration of the following detailed description taken in conjunction with the accompanying drawings, in which:

FIGS. 3A and 3B show examples of received messages. FIG. 3A shows received messages and their receiving time. FIG. 3B shows a state of messages of FIG. 3A stored in memory.

DESCRIPTION OF THE PREFERRED EMBODIMENTS

Figure 1:
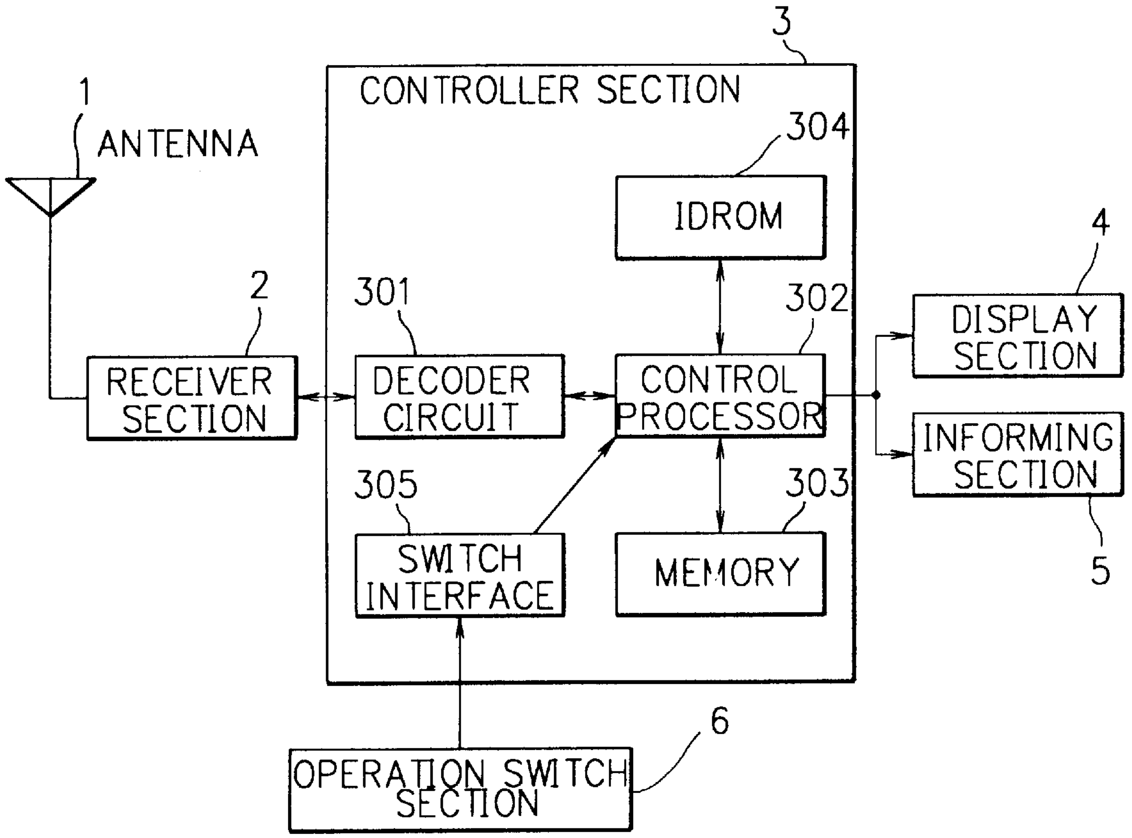
FIG. 1 is a block diagram of an embodiment of the present invention.

Referring now to the drawings, a description will be given in detail of a method and an apparatus in accordance with the present invention.

FIG. 1 shows an embodiment of a pager according to the present invention. The pager comprises an antenna 1, a receiver section 2 to demodulate information sent from base stations (not shown) via the antenna 1, a display section 4 to display received information, an informing section 5 to inform users of reception of information by a speaker, LED, or vibrator, an operation switch section 6 used to input control information, and a controller section 3 to control the above sections.

The controller section 3 has a decoder circuit 301 to decode the demodulated received information sent from the receiver section 2, an IDROM 304 to store the ID of the pager itself, a memory 303 to store the received message information, a switch interface 305 to interface with the operation switch section 6, and a control processor 302 to control the whole pager according to control programs.

In the following, the operation of this embodiment will be described referring to FIG. 1.

A signal received via the antenna 1 and demodulated by the receiver section 2 is sent to the decoder circuit 301 of the controller section 3 and a synchronization signal, a selective calling signal, a message signal in it are identified and judged.

If the received message is addressed to the pager itself, the control processor 302 stores the message in the memory 303, displays the received message on the display section 4, and informs the user of the reception of the message by the speaker, LED, or vibrator of the informing section 5.

The IDROM 304 is a storage element or a memory area for storing the ID number of the pager itself. Various and low price choices are possible for the memory 303, since (1) the memory 303 does not delete nor rewrite messages even when it is storing received messages full of storage capacity and (2) there is no need of high speed operation.

When the received messages have filled the storage capacity of memory 303, the control processor 302 stops and prohibits reception of additional messages. Depending on the situation, one memory can be used both as memory 303 and IDROM 304.

Figure 2:
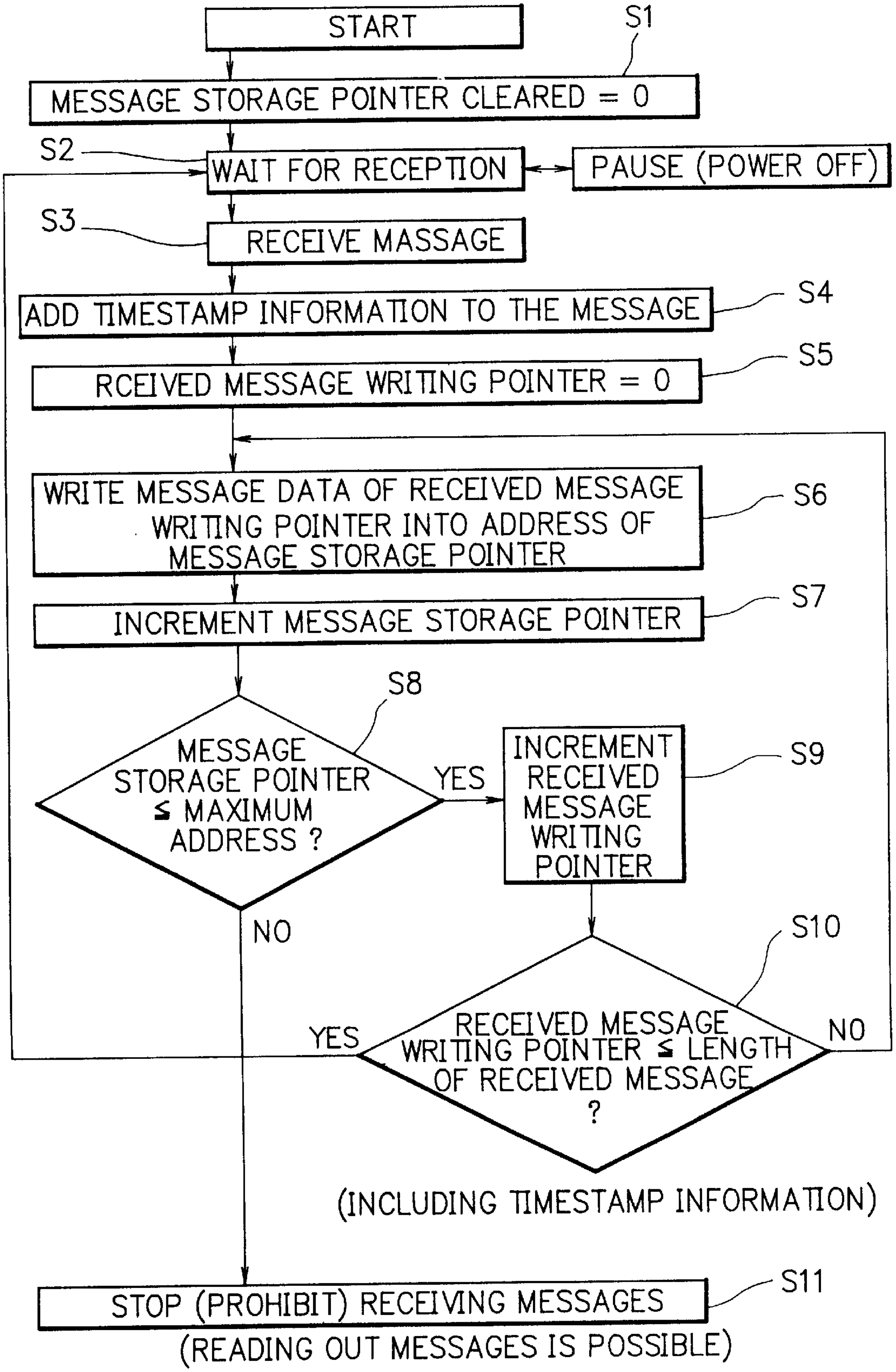
FIG. 2 is a flow sheet showing the operation of an embodiment of the present invention in case of receiving a message.

FIG. 2 is a flow sheet showing the operation of this embodiment when receiving a message FIGS. 3A and 3B show examples of received messages. FIG. 3A shows received messages and their receiving time, and FIG. 3B shows the format of messages of FIG. 3A as stored in memory. In the following, the operation of this embodiment in case of receiving messages will be described in detail with reference to FIGS. 1, 2, 3A and 3B.

In this embodiment, received messages are stored in the memory 303 in order of reception, and a message storage pointer is used in order to indicate an address in the memory 303 to which a newly received message should be written (the address next to the last address up to which messages have already been stored or written). A received message writing pointer is also used in order to show the progress of writing the newly received message.

The message storage pointer is cleared to zero on the beginning of the service (S1) and thereafter it holds its value even if the power supply is shut off (S2).

On receiving a message (S3), the control processor 302 adds to the received message additional information such as a timestamp of receiving time (S4) as shown in FIG. 3A, figures out the length of the message to which the additional information has been added, and starts writing the message in the memory 303 at a message storage address indicated by the message storage pointer (S5, S6).

Along with writing the message, the message storage pointer is incremented at every writing to one address (S7), and it is judged whether the incremented pointer value has not exceeded the maximum address of the message memory 303 (S8). If the value of message storage pointer has exceeded the maximum address, the control processor 302 stops storing the message and prohibits reception of messages thereafter (S11).

If the pointer value has not exceeded the maximum address, the received message writing pointer is also incremented (S9) and it is judged whether the incremented value of the received message writing pointer has not exceeded the length of the newly received message including the afore-mentioned additional information (S10). If the pointer value has exceeded the length of the message, the process returns to the step S2 and the pager waits for reception. If the pointer value has not exceeded the length of the message, the process returns to the step S6 and the storing of the information including the afore-mentioned additional information is continued.

After the step S11, receiving messages is prohibited, but reading out and displaying of the messages stored in the message memory 303 remains possible in this prohibition state.

As shown in FIG. 3B, in the memory 303, terminator codes #1 are written between received messages and additional information such as timestamp information, and terminator codes #2 are written right after messages, each of which is including the additional information. When the next message is received and stored, the storing of the message is started at the address right after the last terminator code #2.

Management of the message storage memory 303 is well executed according to above simple rules only, and complicated operation such as widely used management for every message slot or sector management is not necessary. Moreover, memory usage efficiency is very high since redundant usage of memory such as filling with null codes till the end of a management unit is unnecessary.

In the case of reading out messages, search for terminator codes #1 and #2 indicating terminations of each information is executed and each message is read out. Thereby, the displaying stored messages or stored information such as timestamps is made possible.

As shown above, the pager of this embodiment does not need complex control programs for controlling complicated processes for managing the message storage memory 303. Therefore, low-cost production of the pager becomes possible and for example, disposable pagers can be realized by this embodiment.

Incidentally, although the control processor 302 prohibited not only storing messages but also receiving messages in the step S11 of FIG. 2 in this embodiment, another type of pager is of course possible in which the control processor 302 prohibits storing messages only and thereafter continues receiving and displaying messages.

Figure 4:
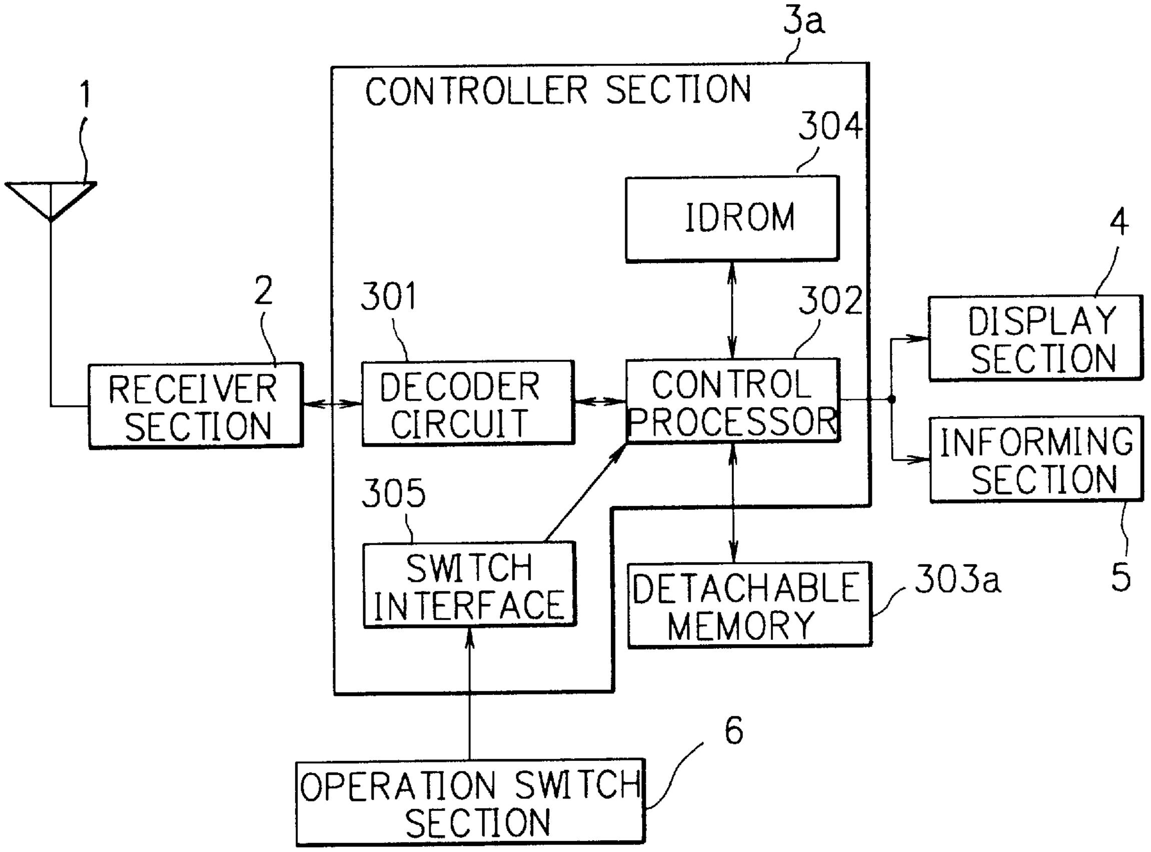
FIG. 4 is a block diagram of another embodiment of the present invention.

FIG. 4 shows another embodiment of the present invention. In FIG. 4, each component which is equivalent to a component of the first embodiment shown in FIG. 1 is assigned the same number as that of FIG. 1. The difference of this embodiment from the first embodiment is a detachable memory 303*a*. The memory 303*a* connected to the controller section 3 is easily removed and attached.

In this second embodiment, plural memories 303*a* can be supplied individually, and even when the whole capacity of memory 303*a* became full of messages, the pager can continue receiving service by the exchange of the memory 303*a*.

Incidentally, the memory 303*a* of the second embodiment is not needed to be rewritable, like the memory 303 in the first embodiment shown in FIG. 1. However the memory 303*a* has to have nonvolatile character, and in this construction, the message storage pointer has to be stored in the nonvolatile memory area of the memory 303*a*. If the whole memory area of the memory 303*a* is nonvolatile, storage of all received messages since the commencement of the service is possible by memories 303*a*.

Detached and stocked memories 303*a* can be attached again to the main body and stored messages can be played back and displayed on the display section 4.

As set forth hereinabove, the present invention provides a pager which does not delete stored messages in order to write a newly received message when message memory (storage means) is full of messages, but just stops storing messages or receiving messages. The pager does not need complex control programs for managing the storage means, thereby production cost is reduced. Memory usage efficiency is very high since messages are stored in the storage means in order of reception time and redundant usage of memory such as filling with null codes till the end of a management unit is unnecessary. The pager produced at a low cost is capable of being supplied as a disposable pager. If the storage means is made capable of being easily removed and attached to the body of the pager, the pager can continue receiving service by the exchange of the storage means. The main body of the pager can be reused after the memory exchange. Nonvolatile character of the storage means makes it possible to stock all received messages since the commencement of the service and display the messages stocked in plural storage means.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A pager comprising:

display means to display received messages;

informing means to inform users of reception of information;

storage means to store the received messages in order of reception, in which additional information such as receiving time of the message and one or more terminator codes are added to each received message;

means for reading out messages stored in said storage means by searching for said terminator codes and displaying the messages by said display means; and means for prohibiting storing the received messages into said storage means after said storage means became almost full of messages;

wherein the first terminator codes written between received messages and their additional information, and the second terminator code written right after additional information, are used as said terminator codes.

2. A pager as claimed in claim 1, wherein said storage means is capable of being easily removed and attached to the body of the pager.

3. A pager as claimed in claim 2, wherein said storage means has nonvolatile memory for holding the stored received messages even after it is removed from the body of the pager.

4. A pager as claimed in claim 1, wherein said prohibiting means also prohibits receiving messages after said storage means became almost full of messages.

* * * * *